US 9,590,454 B2

(12) United States Patent
Bae et al.

(10) Patent No.: US 9,590,454 B2
(45) Date of Patent: Mar. 7, 2017

(54) POWER TRANSMITTER, REPEATER, POWER RECEIVER, AND WIRELESS POWER TRANSMISSION SYSTEM

(75) Inventors: Su Ho Bae, Seoul (KR); Ki Min Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 595 days.

(21) Appl. No.: 14/111,608

(22) PCT Filed: Apr. 6, 2012

(86) PCT No.: PCT/KR2012/002660
§ 371 (c)(1),
(2), (4) Date: Oct. 21, 2013

(87) PCT Pub. No.: WO2012/141458
PCT Pub. Date: Oct. 18, 2012

(65) Prior Publication Data
US 2014/0035390 A1    Feb. 6, 2014

(30) Foreign Application Priority Data
Apr. 13, 2011  (KR) .................. 10-2011-0034457

(51) Int. Cl.
*H01F 38/00* (2006.01)
*H02J 17/00* (2006.01)
(Continued)

(52) U.S. Cl.
CPC .............. *H02J 17/00* (2013.01); *H01F 38/14* (2013.01); *H02J 7/025* (2013.01)

(58) Field of Classification Search
CPC .................................. H02J 17/00; H01F 38/14
(Continued)

(56) References Cited

U.S. PATENT DOCUMENTS

2007/0080804 A1*  4/2007  Hirahara ............. G06K 7/0008
                                                                340/572.1
2008/0001758 A1    1/2008  Bhogal et al.
(Continued)

FOREIGN PATENT DOCUMENTS

JP    2010263690 A    11/2010
JP    2010267917 A    11/2010
(Continued)

OTHER PUBLICATIONS

International Search Report in International Application No. PCT/KR2012/002660, filed Apr. 6, 2012.
(Continued)

*Primary Examiner* — Jared Fureman
*Assistant Examiner* — Alfonso Perez Borroto
(74) *Attorney, Agent, or Firm* — Saliwanchik, Lloyd & Eisenschenk

(57) ABSTRACT

Disclosed is a wireless power transmission system. The wireless power transmission system includes a power transmitter including a first resonant circuit and wirelessly transmitting power using a resonance, at least one repeater including a second resonant circuit resonating with the first resonant circuit, and a power receiver disposed between the power transmitter and the repeater, including a third resonant circuit magnetically resonating with the first and second resonant circuits, and receiving power from the power transmitter and the repeater. If the power transmitter and the repeater are installed in an indoor space, such as a room or an office room, and the power receiver is installed in a mobile device, such as a cellular phone, the mobile device is automatically charged in the indoor space. The power transmission efficiency is improved by installing the power receiver between the power transmitter and the repeater. The
(Continued)

received power is adjusted according to the alignment direction of the power receiver.

18 Claims, 4 Drawing Sheets

(51) Int. Cl.
  *H02J 7/02* (2016.01)
  *H01F 38/14* (2006.01)
(58) Field of Classification Search
  USPC .......................................................... 307/104
  See application file for complete search history.

(56) References Cited

U.S. PATENT DOCUMENTS

| | | | |
|---|---|---|---|
| 2008/0266748 A1 | 10/2008 | Lee | |
| 2009/0072629 A1* | 3/2009 | Cook | H02J 17/00 307/104 |
| 2009/0127937 A1* | 5/2009 | Widmer | H02J 5/005 307/149 |
| 2009/0286470 A1 | 11/2009 | Mohammadian et al. | |
| 2010/0038970 A1* | 2/2010 | Cook | H02J 5/005 307/104 |
| 2011/0115430 A1* | 5/2011 | Saunamaki | H02J 5/005 320/108 |
| 2011/0127848 A1* | 6/2011 | Ryu | H02J 5/005 307/104 |

FOREIGN PATENT DOCUMENTS

| | | |
|---|---|---|
| KR | 10-2002-0007117 A | 1/2002 |
| KR | 20040072581 A | 8/2004 |

OTHER PUBLICATIONS

Office Action dated Jan. 18, 2017 in Chinese Application No. 1020110034457.

* cited by examiner (a)

(b)

POWER TRANSMITTER, REPEATER, POWER RECEIVER, AND WIRELESS POWER TRANSMISSION SYSTEM

CROSS-REFERENCE TO RELATED APPLICATIONS

This application is the U.S. national stage application of International Patent Application No. PCT/KR2012/002660, filed Apr. 6, 2012, which claims priority to Korean Application No. 10-2011-0034457, filed Apr. 13, 2011, the disclosures of each of which are incorporated herein by reference in their entirety.

TECHNICAL FIELD

The embodiment relates to a wireless power transmission. More particularly, the embodiment relates to a wireless power transmission capable of improving the power transmission efficiency in the wireless power transmission employing the resonance.

BACKGROUND ART

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electric energy by irradiating electromagnetic waves, such as radio waves or lasers, has been suggested. Actually, electric toothbrushes or electric razors, which are frequently used in daily life, are charged based on the principle of electromagnetic induction. Until now, the long-distance transmission employing the magnetic induction, the resonance and the short-wavelength radio frequency has been used as the wireless energy transfer scheme.

Among them, according to the wireless power transmission employing the resonance, power is supplied from an AC source to generate AC power in a transmission coil and a resonant coil is coupled to the transmission coil to transmit the power through the resonant coil. The wireless power transmission employing the resonance can transmit the power farther than the wireless power transmission employing the electromagnetic induction, but the transmission distance is still short, so the improvement thereof is necessary.

DISCLOSURE OF INVENTION

Technical Problem

The embodiment provides a method for improving the transmission efficiency in a wireless power transmission employing the resonance.

The embodiment provides a method for improving the transmission efficiency by installing a power receiver between a power transmitter and a repeater.

The embodiment provides a method for adjusting received power according to the alignment direction of a power receiver.

Solution to Problem

A wireless power transmission system according to one embodiment includes a power transmitter including a first resonant circuit and wirelessly transmitting power using a resonance; at least one repeater including a second resonant circuit resonating with the first resonant circuit; and a power receiver disposed between the power transmitter and the repeater, including a third resonant circuit magnetically resonating with the first and second resonant circuits, and receiving power from the power transmitter and the repeater.

A power transmitter wirelessly transmitting power using a resonance according to the embodiment includes a power source generating the power having a predetermined frequency for the resonance; and a first resonant circuit transmitting the power using the resonance, wherein the power transmitter transmits the power to a power receiver disposed between the power transmitter and a repeater using the resonance with the repeater including a second resonant circuit and the power receiver including a third resonant circuit.

A repeater wirelessly transmitting power using a resonance according to the embodiment includes a second resonant circuit transmitting the power received from a power transmitter using the resonance, wherein the repeater transmits the power to a power receiver disposed between the power transmitter and the repeater using the resonance with the power transmitter including a first resonant circuit and the power receiver including a third resonant circuit.

A power receiver according to the embodiment includes a third resonant circuit, wherein the power receiver is disposed between a power transmitter including a first resonant circuit and wirelessly transmitting power using a resonance and at least one repeater including a second resonant circuit resonating with the first resonant circuit, and the third resonant circuit magnetically resonates with the first and second resonant circuits, and the power receiver wirelessly receives power from the power transmitter and the at least one repeater.

Advantageous Effects of Invention

According to the embodiment, the wireless power transmission efficiency can be improved by the resonance.

In addition, according to the embodiment, if the power transmitter and the repeater are installed in an indoor space, such as a room or an office room, and the power receiver is installed in a mobile device, such as a cellular phone, the mobile device can be automatically charged in the indoor space.

Further, according to the embodiment, the power transmission efficiency can be improved by installing the power receiver between the power transmitter and the repeater.

According to the embodiment, the received power can be adjusted according to the alignment direction of the power receiver.

BEST MODE FOR CARRYING OUT THE INVENTION

Hereinafter, embodiments will be described in more detail with reference to accompanying drawings.

Figure 1:
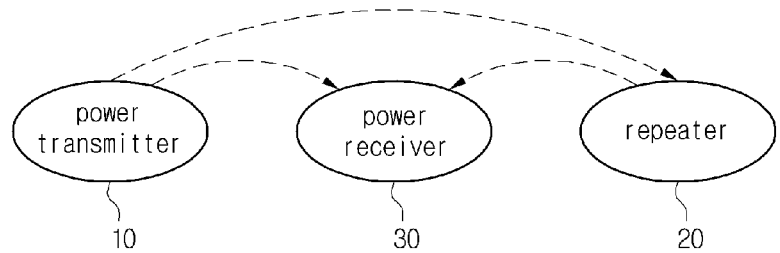
FIG. 1 is a schematic view showing the structure of a wireless power transmission system according to one embodiment.

FIG. 1 is a schematic view showing the structure of a wireless power transmission system according to one embodiment.

As shown in FIG. 1, the wireless power transmission system according to one embodiment includes a power transmitter 10, a repeater 20 and a power receiver 30.

The power transmitter 10 may include a power source and a first resonant circuit. According to one embodiment, the power source may be separated provided without being included in the power transmitter 10.

The power transmitter 10 can wirelessly radiate AC power, which is received from the power source, using the resonance.

The first resonant circuit may include a transmission coil and a transmission resonant coil.

The repeater 20 may include a second resonant circuit. The second resonant circuit makes the resonance with the first resonant circuit at a predetermined frequency. The repeater 20 can transmit the power upon receiving the power from the power transmitter 10.

The power receiver 30 may include a third resonant circuit and a rectifier circuit. That is, the power receiver 30 can receive the power from the power transmitter 10 and the repeater 20 and can supply the power to the load by rectifying the power.

The third resonant circuit may include a receiving resonant coil and a receiving coil.

The transmitting resonant coil of the power transmitter 10 transmits power to the receiving resonant coil of the power receiver 30 using magnetic field. The transmitting resonant coil and the receiving resonant coil are magnetically coupled and each of them can operate at resonant frequency. Resonant coupling of the transmitting resonant coil and the receiving resonant coil significantly improves power transmission efficiency between the power transmitter 10 and the power receiver 30.

The power receiver 30 may be disposed between the power transmitter 10 and the repeater 20.

According to the wireless power transmission employing the resonance of the related art, the power transmitter 10 directly transmits the power to the power receiver 30 without the repeater 20. However, the experimental result shows that the transmission distance of the wireless power can be more expanded if the repeater including another resonant circuit is interposed between the power transmitter and the power receiver.

Although the repeater is interposed between the power transmitter 10 and the power receiver 30 according to the embodiment, the experimental result shows that the transmission distance of the wireless power can be expanded even if the repeater is located farther from the power transmitter 10 than the power receiver 30 is.

The first resonant circuit included in the power transmitter 10 can radiate the power without the specific directionality. In short, greater power is simply transmitted by the circuits making the resonance at the predetermined frequency. Thus, the power received in the power receiver 30 is a part of the power radiated from the power transmitter 10 and great power loss may occur because the power may radiate into other spaces.

The repeater 20 according to the embodiment receives the power radiated into the other spaces and retransmits the power to the power receiver 30. Since a part of the retransmitted power can be received in the power receiver 30, the power transmission efficiency can be improved.

Figure 2:
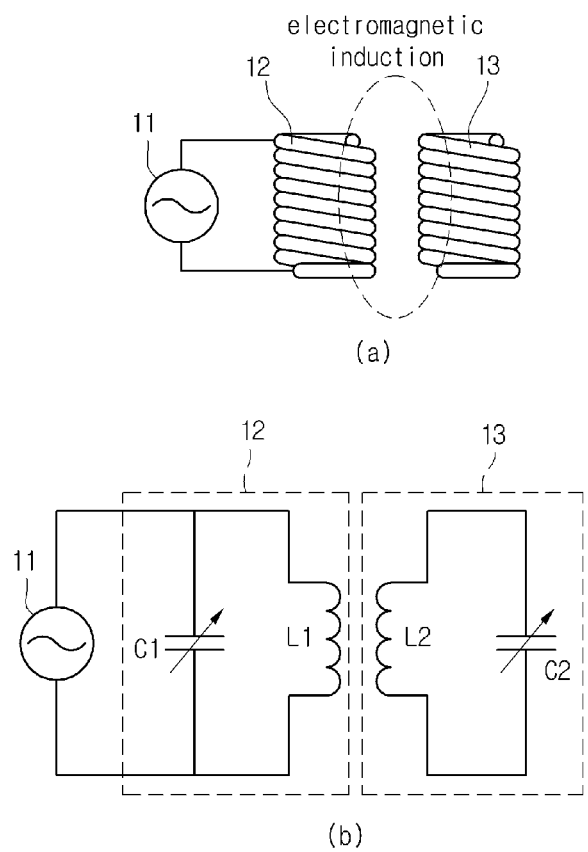
FIG. 2 (a) is a view showing the structure of a power transmitter 10 according to one embodiment, and FIG. 2 (b) is a view showing an equivalent circuit thereof.

FIG. 2 (*a*) is a view showing the structure of the power transmitter 10 according to one embodiment, and FIG. 2 (*b*) is a view showing an equivalent circuit thereof.

The power transmitter 10 includes a power source 11, a transmission coil 12, and a transmission resonant coil 13.

The power source 11 is an AC power source to supply AC power having a predetermined frequency. That is, the power source 11 can generate the power having a frequency for the resonance.

The transmission coil 12 is connected to the power source 11 and AC current is applied to the transmission coil 12. As the AC current is applied to the transmission coil 12, the AC current is induced to the transmission resonant coil 13, which is physically spaced apart from the transmission coil 12, using the electromagnetic induction. The power transmitted to the transmission resonant coil 13 is transmitted to the power receiver 30, which forms a resonant circuit together with the power transmitter 10, using the resonance.

According to the power transmission using the resonance, the power can be transmitted between two resonant circuits which are impedance-matched. The power transmission using the resonance can transmit the power farther than the power transmission using the electromagnetic induction with the high power transmission efficiency.

FIG. 2 (*b*) shows the equivalent circuit of the power transmitter 10 according to one embodiment. The transmission coil 12 and the transmission resonant coil 13 may consist of inductors L1 and L2 having predetermined inductance values and capacitors C1 and C2 having predetermined capacitance values, respectively.

Figure 3:
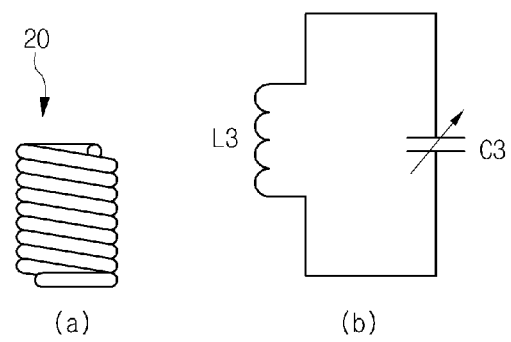
FIG. 3 (a) is a view showing the structure of a repeater 20 according to one embodiment, and FIG. 3 (b) is a view showing an equivalent circuit thereof.

FIG. 3 (*a*) is a view showing the structure of the repeater 20 according to one embodiment, and FIG. 3 (*b*) is a view showing an equivalent circuit thereof. As shown in FIG. 3 (*a*), the repeater 20 may consist of a coil having a predetermined inductance value and a capacitance value and the equivalent circuit of the repeater 20 is shown in FIG. 3 (*b*).

Figure 4:
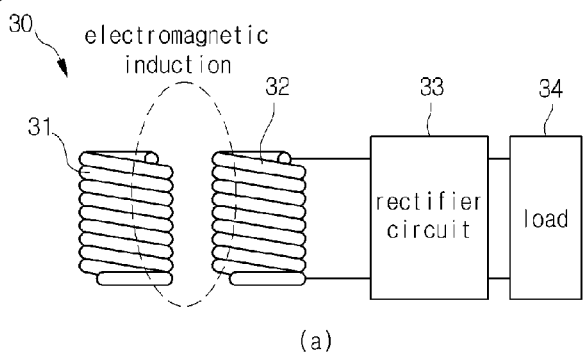
FIG. 4 (a) is a view showing the structure of a power receiver 30 according to one embodiment, and FIG. 4 (b) is a view showing an equivalent circuit thereof.
Figure 4:
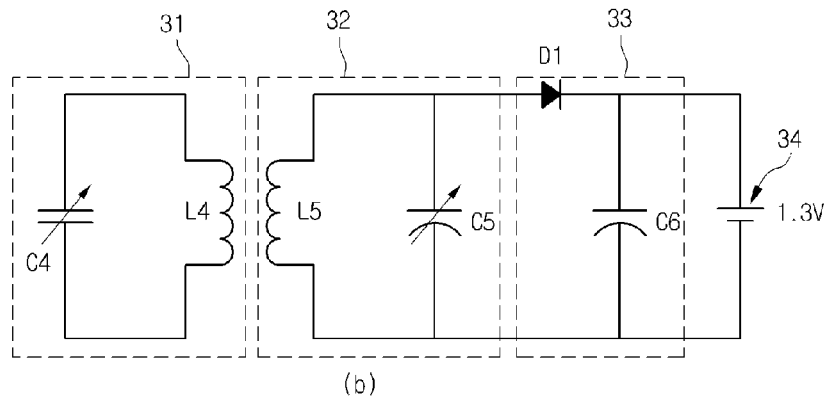

FIG. 4 (*a*) is a view showing the structure of the power receiver 30 according to one embodiment, and FIG. 4 (*b*) is a view showing an equivalent circuit thereof.

The power receiver 30 includes a receiving resonant coil 31 and a receiving coil 32. The transmission resonant coil 13 transmits the power to the receiving resonant coil 31 using the resonance. The receiving resonant coil 31 receives the power and AC current is applied to the receiving resonant coil 31. The power transmitted to the receiving resonant coil 31 is transmitted to the receiving coil 32 using the electromagnetic induction. The power transmitted to the receiving coil 32 is rectified through a rectifier circuit 33 and then transmitted to a load 34.

FIG. 4 (b) shows the equivalent circuit of the receiving resonant coil 31, the receiving coil 32, the rectifier circuit 33 and the load 34 according to one embodiment.

As shown in FIG. 4, the receiving resonant coil 31 and the receiving coil 32 may consist of inductors L4 and L5 having predetermined inductance values and capacitors C4 and C5 having predetermined capacitance values, respectively. The rectifier circuit 33 may consist of a diode D1 and a smoothing capacitor C6 and can output DC power by converting AC power to the DC power. Although the load 34 is shown as a DC power source of 1.3V, the load 34 may be a battery or a device requiring the DC power. The voltage level of 1.3V is illustrative purpose only.

Figure 5:
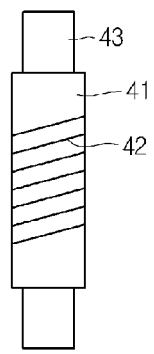
FIG. 5 is a view showing a solenoid type coil as an example of a resonant circuit according to one embodiment.
Figure 6:
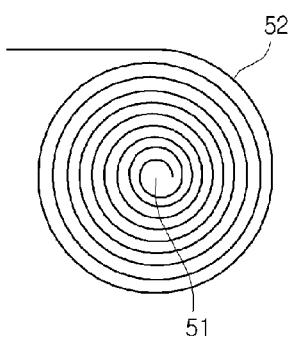
FIG. 6 is a view showing a spiral type coil as an example of a resonant circuit according to one embodiment.

FIG. 5 is a view showing a solenoid type coil as an example of the resonant circuit according to one embodiment and FIG. 6 is a view showing a spiral type coil as an example of the resonant circuit according to one embodiment.

As shown in FIGS. 5 and 6, the solenoid type coil can be formed by mounting a bobbin 42 on a core 41 and winding a wire 43 in the length direction of the bobbin 42. The spiral type coil can be formed by winding a wire 52 around the core 51.

The coil shown in FIGS. 5 and 6 can be used as the transmission coil 12 and the transmission resonant coil 13 of the power transmitter 10, the repeater 20, and the receiving resonant coil 31 and receiving coil 32 of the power receiver 30.

Figure 7:
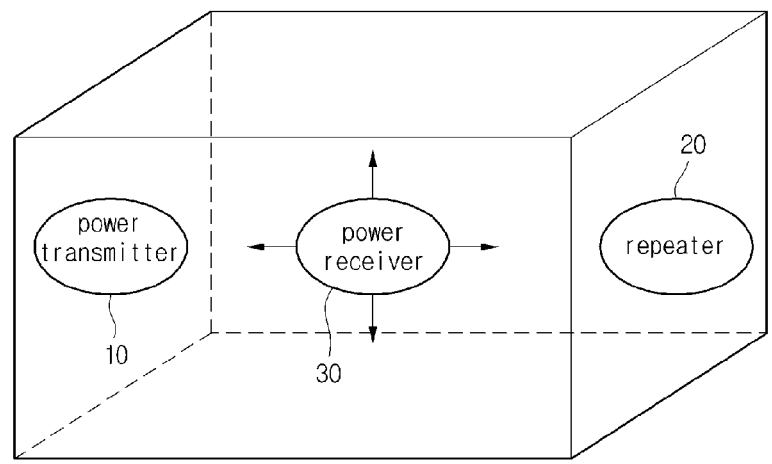
FIG. 7 is a view showing a power transmitter 10, a power receiver 30 and one repeater 20, which are installed in the same space, according to one embodiment.

FIG. 7 is a view showing the power transmitter 10, the power receiver 30 and one repeater 20, which are installed in the same space, according to one embodiment.

As shown in FIG. 7, the power transmitter 10 can be fixed to a wall of a space, such as a wall of a room or an office room. In addition, the repeater 20 can be fixed to a wall opposite to the wall to which the power transmitter 10 is fixed or the other wall.

According to one embodiment, the power receiver 30 can be installed in a mobile device, such as a cellular phone, a notebook computer or an MP3 player. The mobile device equipped with the power receiver 30 can be automatically charged when the mobile device is placed in the above space.

According to one embodiment, the power receiver 30 can be installed in a non-mobile device, such as a TV, an audio device or a desk-top computer. As shown in FIG. 7, the power receiver 30 is disposed in a space between the power transmitter 10 and the repeater 20 to simultaneously receive the power from both of the power transmitter 10 and the repeater 20.

Figure 8:
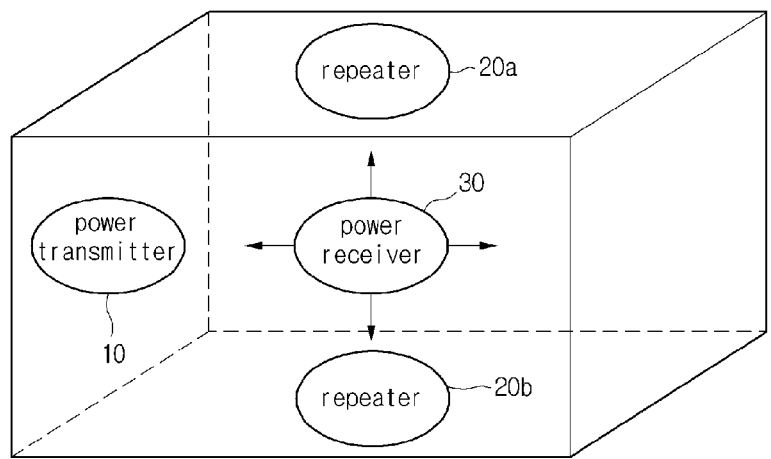
FIG. 8 is a view showing a power transmitter 10, a power receiver 30 and two repeaters 20, which are installed in the same space, according to one embodiment.

FIG. 8 is a view showing the power transmitter 10, the power receiver 30 and two repeaters 20, which are installed in the same space, according to one embodiment.

As shown in FIG. 8, a plurality of repeaters 20a and 20b can be installed in the same space. In this case, the power receiver 30 can simultaneously receive the power from both of the power transmitter 10 and the repeaters 20a and 20b.

Hereinafter, a method for adjusting the power transmitted to the power receiver 30 from the repeater 20 according to the alignment direction of the power receiver 30 will be described with reference to FIGS. 9 to 12.

Figure 9:
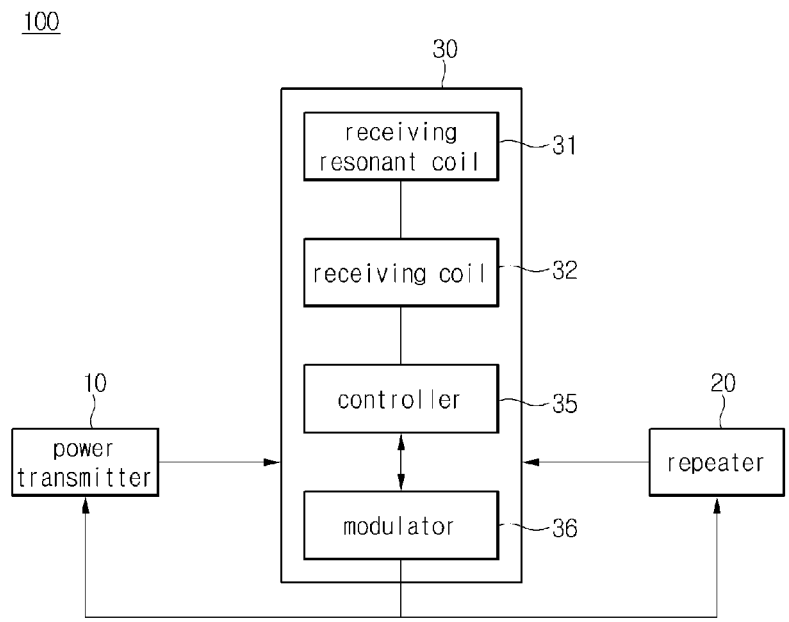
FIG. 9 is a view showing the structure of a wireless power transmission system according to the second embodiment.

FIG. 9 is a view showing the structure of a wireless power transmission system according to the second embodiment.

Referring to FIG. 9, the wireless power transmission system includes a power source, a power transmitter 10, a repeater 20 and a power receiver 30.

The power source and the power transmitter 10 are the same as those shown in FIGS. 2 and 3, so detailed description thereof will be omitted.

The power receiver 30 may include a receiving resonant coil 31, a receiving coil 32, a controller 35 and a modulator 36. Although not shown in FIG. 9, the power receiver 30 according to one embodiment may further include a rectifier circuit 33 as shown in FIG. 4.

The controller 35 can check whether the power required for operating the power receiver 30 is normally supplied.

If the power received in the power receiver 30 from the power transmitter 10 and the repeater 20 is equal to or less than the critical value, the controller 35 generates the control signal to adjust the power and transmit the control signal to the modulator 36. According to one embodiment, if there is no power received in the power receiver 30, the control signal serves as a power blocking signal for blocking the power transmitted from the power transmitter 10 and the repeater 20. The power may not be received in the power receiver 30 when the power transmitter 10 and the repeater 20 are vertically arranged and the power receiver 30 is horizontally arranged. This configuration will be described later in detail with reference to FIGS. 10 and 11.

The modulator 36 receivers the control signal from the controller 35 to adjust the power and transmits the control signal to the power transmitter 10 and the repeater 20.

The power transmitter 10 and the repeater 20 receive the control signal from the modulator 36 to adjust the power transmitted to the power receiver 30. According to one embodiment, if the control signal is a power blocking signal, the power transmitter 10 and the repeater 20 may shut off the power transmitted to the power receiver 30.

The power transmitter 10 and the repeater 20 can shut off the power transmitted to the power receiver 30 using various schemes. For instance, if the repeater 20 receives the power blocking signal from the modulator 36, a switch between the resonant coil L3 and the capacitor C3 is turned off to shut off the power transmitted to the power receiver 30. The repeater 20 may further include a control unit (not shown). The repeater 20 may turn on or off the switch according to the control signal transmitted from the modulator 36 through the controller.

According to one embodiment, if the power transmitter 10 receives the power blocking signal from the modulator 36, the switch can be used as described above or the power source 11 receiving the power blocking signal may shut off the power transmitted to the transmission coil L2.

Figure 10:
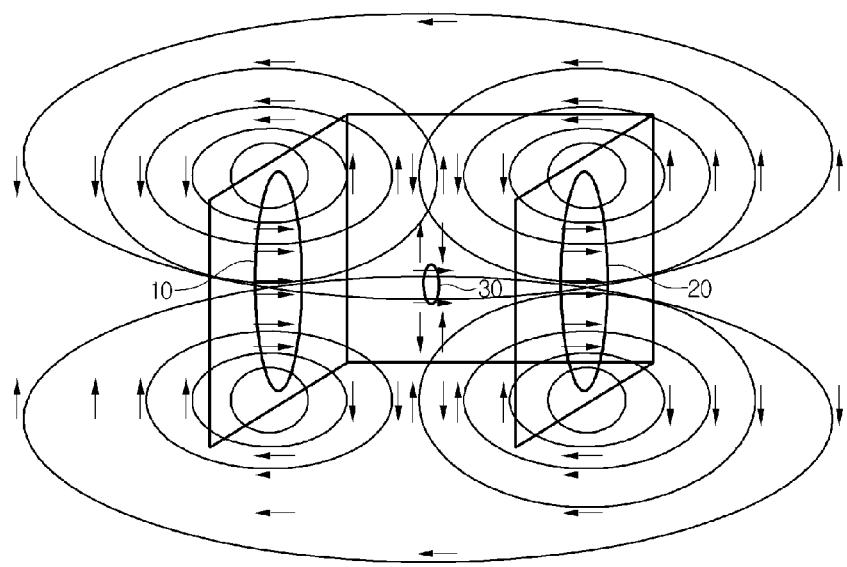
FIG. 10 is a view to explain the direction of a magnetic force line transmitted to a power receiver 30 when a power transmitter 10, a repeater 20 and the power receiver 30 are arranged in the same direction.

FIG. 10 is a view to explain the direction of a magnetic force line transmitted to the power receiver 30 when the power transmitter 10, the repeater 20 and the power receiver 30 are arranged in the same direction.

Referring to FIG. 10, the power transmitter 10, the repeater 20 and the power receiver 30 are vertically arranged. In detail, the transmission resonant coil 13, the receiving resonant coil 31 and the resonant coil of the repeater 20 are vertically arranged.

In this case, the magnetic force line transmitted to the power receiver 30 from the power transmitter 10 is not canceled with the magnetic force line transmitted to the power receiver 30 from the repeater 20. That is, as shown in FIG. 10, the direction of the magnetic force line transmitted to the power receiver 30 from the power transmitter 10 may not deviate from the direction of the magnetic force line transmitted to the power receiver 30 from the repeater 20, but overlap with each other.

Figure 11:
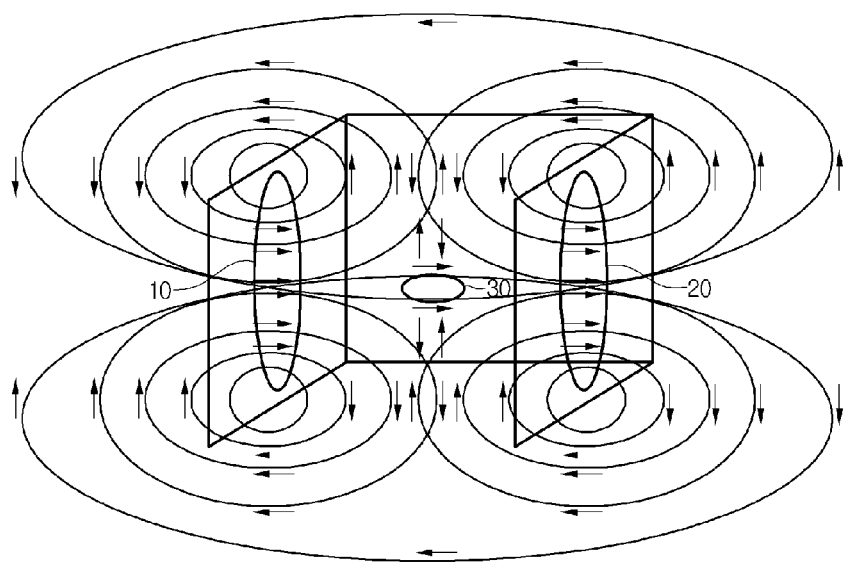
FIG. 11 is a view to explain the direction of a magnetic force line transmitted to a power receiver 30 when a power transmitter 10 is arranged in the direction different from the direction of a repeater 20 and the power receiver 30.

FIG. 11 is a view to explain the direction of the magnetic force line transmitted to the power receiver 30 when the power transmitter 10 is arranged in the direction different from the direction of the repeater 20 and the power receiver 30.

Referring to FIG. 11, the result is different from that of FIG. 10.

As shown in FIG. 11, the power transmitter 10 and the repeater 20 are vertically arranged and the power receiver 30 is horizontally arranged. In detail, the transmission resonant coil 13 and the resonant coil of the repeater 20 are vertically arranged and the receiving resonant coil 31 is horizontally arranged.

In this case, the magnetic force line transmitted to the power receiver 30 from the power transmitter 10 is canceled with the magnetic force line transmitted to the power receiver 30 from the repeater 20. That is, referring to the magnetic force line shown in FIG. 11, the direction of the magnetic force line transmitted to the power receiver 30 from the power transmitter 10 may deviate from the direction of the magnetic force line transmitted to the power receiver 30 from the repeater 20. If the power receiver 30 is horizontally arranged at the region where the direction of the magnetic force line deviates, the power transmitted to the power receiver 30 may be reduced due to the cancellation of the magnetic force line.

Figure 12:
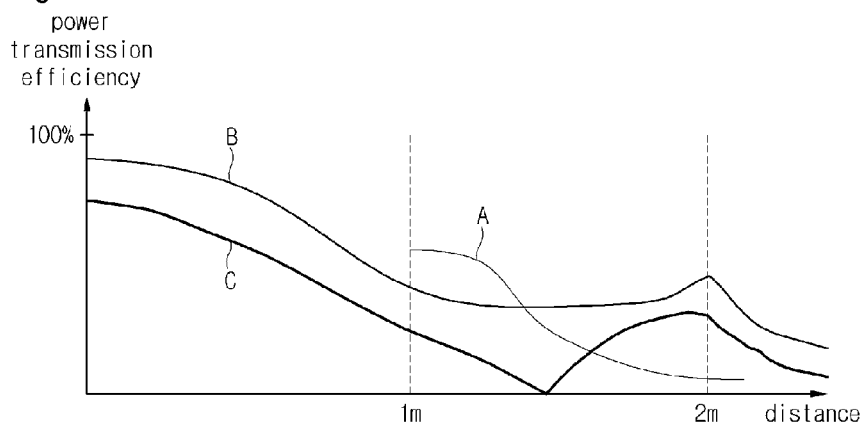
FIG. 12 is a graph showing the power transmission efficiency according to the relative position between a power transmitter 10 and a repeater 20.

FIG. 12 is a graph showing the power transmission efficiency according to the relative position between the power transmitter 10 and the repeater 20.

The X-axis represents the position of the repeater 20 in the case that the position of the power transmitter 10 is fixed.

The Y-axis represents the power transmission efficiency between the power transmitter 10 and the power receiver 30 and between the repeater 20 and the power receiver 30.

Graph (A) shows the power transmission efficiency as a function of distance when the repeater 20 is located at the position far from the power transmitter 10 by 1 m and the power receiver 30 is located at the position far from the power transmitter 10 by 2 m. That is, the repeater 20 is located between the power transmitter 10 and the power receiver 30.

Graph (B) shows the power transmission efficiency as a function of distance when the repeater 20 is located at the position far from the power transmitter 10 by 2 m and the power receiver 30 is located at the position far from the power transmitter 10 by 2 m. In this case, the power transmitter 10, the repeater 20 and the power receiver 30 are vertically arranged.

Graph (C) shows the power transmission efficiency as a function of distance when the repeater 20 is located at the position far from the power transmitter 10 by 2 m and the power receiver 30 is located at the position far from the power transmitter 10 by 2 m. In this case, the power transmitter 10 and the repeater 20 are vertically arranged and the power receiver 30 is horizontally arranged.

When comparing graph (A) with graph (B), it can be confirmed that the power transmission efficiency can be improved as the repeater 20 is away from the power transmitter 10.

When comparing graph (B) with graph (C), it can be confirmed that the power transmission efficiency is degraded when the power receiver 30 is horizontally arranged as compared with the case where the power receiver 30 is vertically arranged. Especially, when the power receiver 30 is horizontally arranged, there is a region where the power transmission efficiency is zero (0). Thus, if the power receiver 30 is horizontally arranged, as explained with reference to FIG. 9, it is necessary to adjust the power transmitted to the power receiver 30 based on the power receiving status of the power receiver 30 in order to reduce the power consumed in the power transmitter 10 and the repeater 20.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmission system, comprising:
   a power transmitter including a first resonant circuit and wirelessly transmitting power;
   at least one repeater including a second resonant circuit resonating with the first resonant circuit; and
   a power receiver disposed between the power transmitter and the repeater, including a third resonant circuit resonating with at least one of the first and second resonant circuits;
   wherein the at least one repeater is configured to receive power from the power transmitter and transmit power to the power receiver,
   wherein the power receiver is configured to receive power directly from the power transmitter and receive power from the at least one repeater, and
   wherein the power that the power receiver receives from the at least one repeater originates from the power transmitter.

2. The wireless power transmission system of claim 1, wherein each of the first, second and third resonant circuits includes an inductor and a capacitor.

3. The wireless power transmission system of claim 1, wherein each of the first, second and third resonant circuits includes at least one of solenoid type coils or spiral type coils.

4. The wireless power transmission system of claim 1, wherein the power transmitter and the at least one repeater are fixable and the power receiver is movable.

5. A power transmitter for wirelessly transmitting power, the power transmitter comprising:
   a power source generating the power having a predetermined frequency for a resonance; and
   a first resonant circuit transmitting the power using the resonance,
   wherein the power transmitter transmits the power to a power receiver disposed between the power transmitter and at least one repeater, the at least one repeater including a second resonant circuit and the power receiver including a third resonant circuit;

wherein the at least one repeater is configured to receive power from the power transmitter and transmit power to the power receiver, wherein the power receiver is configured to receive power directly from the power transmitter and receive power from the at least one repeater, and wherein the power that the power receiver receives from the at least one repeater originates from the power transmitter.

6. The power transmitter of claim 5, further comprising a transmission coil that receives AC power from the power source and transmits the AC power to the first resonant circuit using an electromagnetic induction.

7. A repeater for wirelessly transmitting power, the repeater comprising:

a second resonant circuit transmitting the power from a power transmitter using a resonance to a power receiver, wherein the power receiver is disposed between the power transmitter and the repeater, the power transmitter including a first resonant circuit and the power receiver including a third resonant circuit;

wherein the repeater is configured to receive power from the power transmitter and transmit power to the power receiver, wherein the power receiver is configured to receive power directly from the power transmitter and receive power from the repeater, and wherein the power that the power receiver receives from the repeater originates from the power transmitter.

8. The repeater of claim 7, wherein each of the first, second and third resonant circuits includes at least one of solenoid type coils or spiral type coils.

9. The repeater of claim 7, wherein a plurality of repeaters is provided to transfer the power received from the power transmitter to the power receiver.

10. A power receiver comprising:

a third resonant circuit, wherein the power receiver is disposed between a power transmitter and at least one repeater, the power transmitter including a first resonant circuit and wirelessly transmitting power using a resonance to the power receiver and the at least one repeater each including a second resonant circuit resonating with the first resonant circuit;

wherein the third resonant circuit magnetically resonates with at least one of the first and second resonant circuits, wherein the power receiver is configured to receive power directly from the power transmitter and receive power from the at least one repeater, wherein the at least one repeater is configured to receive power from the power transmitter and transmit power to the power receiver, and wherein the power that the power receiver receives from the at least one repeater originates from the power transmitter.

11. The power receiver of claim 10, further comprising:

a controller that detects the power from at least one of the power transmitter and the at least one repeater and generates a control signal to adjust the received power according to the detected power; and a modulator for transmitting the control signal to the power transmitter or the at least one repeater.

12. The power receiver of claim 11, wherein the controller transmits a power blocking signal to the modulator to shut off the power transmitted to the power receiver when the power received in the power receiver is equal to or less than a critical value.

13. The power receiver of claim 11, wherein the controller transmits a power blocking signal to the modulator to shut off the power transmitted to the power receiver when there is no power received in the power receiver.

14. The power receiver of claim 10, further comprising:

a receiving coil that receives the power from the third resonant circuit using an electromagnetic induction.

15. The power receiver of claim 11, wherein the controller transmits a power blocking signal to the modulator to shut off the power transmitted to the at least one repeater when the power received in the power receiver is equal to or less than a critical value.

16. The power receiver of claim 11, wherein the controller transmits a power blocking signal to the modulator to shut off the power transmitted to the at least one repeater when there is no power received in the power receiver.

17. The wireless power transmission system of claim 10, wherein the third resonant circuit is disposed on a space surrounded by the power transmitter and the at least one repeater.

18. The wireless power transmission system of claim 10, wherein the at least one repeater is disposed at a wirelessly power-reachable distance from the power transmitter.

* * * * *